(12) United States Patent
Oizumi

(10) Patent No.: US 7,177,139 B2
(45) Date of Patent: Feb. 13, 2007

(54) ELECTRICAL DOUBLE LAYER CAPACITOR

(75) Inventor: Wataru Oizumi, Miyagi (JP)

(73) Assignee: NEC Tokin Corporation, Miyagi (JP)

( * ) Notice: Subject to any disclaimer, the term of this patent is extended or adjusted under 35 U.S.C. 154(b) by 21 days.

(21) Appl. No.: 11/205,027

(22) Filed: Aug. 17, 2005

(65) Prior Publication Data

US 2006/0039099 A1 Feb. 23, 2006

(30) Foreign Application Priority Data

Aug. 18, 2004 (JP) ............................. 2004-238394

(51) Int. Cl.
*H01G 9/00* (2006.01)
(52) U.S. Cl. ...................... 361/502; 361/503; 361/504; 361/508; 361/512; 361/523; 361/528; 29/25.03
(58) Field of Classification Search ................ 361/502, 361/503, 504, 508–512, 516–523, 524–534; 29/25.03
See application file for complete search history.

(56) References Cited

U.S. PATENT DOCUMENTS

| | | | | |
|---|---|---|---|---|
| 6,282,081 B1 * | 8/2001 | Takabayashi et al. | ....... | 361/502 |
| 6,552,894 B2 * | 4/2003 | Matsuoka et al. | .......... | 361/502 |
| 6,631,073 B1 * | 10/2003 | Sakata et al. | ................ | 361/502 |
| 6,862,168 B2 * | 3/2005 | Ando et al. | .................. | 361/504 |
| 7,006,346 B2 * | 2/2006 | Volfkovich et al. | ......... | 361/502 |
| 2002/0089814 A1 | 7/2002 | Noguchi et al. | | |

FOREIGN PATENT DOCUMENTS

| | | |
|---|---|---|
| JP | 11-345747 | 12/1999 |
| JP | 2000-58038 | 2/2000 |
| JP | 2002-75802 | 3/2002 |
| JP | 2002-83749 | 3/2002 |
| JP | 2003-100569 | 4/2003 |

* cited by examiner

*Primary Examiner*—Nguyen T. Ha
(74) *Attorney, Agent, or Firm*—Whitham, Curtis, Christofferson & Cook, PC

(57) ABSTRACT

An electrical double layer capacitor is provided which is capable of ensuring its reliability and providing increased energy density per unit volume of a capacitor. A negative electrode is so configured as to cover all surfaces of a positive electrode and, therefore, there is no portion in which the positive electrode does not face the negative electrode, which enables generation of gas within the capacitor to be suppressed and ensures reliability of the capacitor. Portions in which the negative electrode do not face the positive electrode serve as non-covered portions and, therefore, electrostatic capacitance per unit volume of electrodes is made to increase, and energy density is improved.

6 Claims, 9 Drawing Sheets

11; Electrical Double Layer Capacitor

FIG.6

| | Electrostatic Capacitance per Unit Volume of Electrode (F/cc) | Decrease Rate of Volume Occurring after voltage Applying Test (%) | State of Capacitor Occurring after Voltage Applying Test |
|---|---|---|---|
| Embodiment 1 | 16.71 | 8% | No Abnormality |
| Comparative Example 1 | 15.15 | 9% | No Abnormality |
| Comparative Example 2 | 15.23 | 28% | Rupture of Three Pieces |

21;Electrical Double Layer Capacitor

FIG. 8

| | Electrostatic Capacitance per Unit Volume of Electrode (F/cc) | Decrease Rate of Volume Occurring after voltage Applying Test (%) | State of Capacitor Occurring after Voltage Applying Test |
|---|---|---|---|
| Embodiment 2 | 16.55 | 11% | No Abnormality |
| Comparative Example 3 | 15.02 | 12% | No Abnormality |
| Comparative Example 4 | 15.08 | 30% | Rupture of Four Pieces |

ELECTRICAL DOUBLE LAYER CAPACITOR

BACKGROUND OF THE INVENTION

1. Field of the Invention

The present invention relates to an electrical double layer capacitor and more particularly to the electrical double layer capacitor that can be suitably used when energy density per unit volume is made higher.

The present application claims priority of Japanese Patent Application No. 2004-238394 filed on Aug. 18, 2004, which is hereby incorporated by reference.

2. Description of the Related Art

An electrical double layer capacitor has advantages that cannot be provided by a nickel-hydrogen secondary cell, lithium-ion secondary cell or a like; that is, the electrical double layer capacitor can be charged rapidly and discharged at a large electric current and its characteristics are not degraded even when charging and discharging are repeated ten thousand times or more. Due to this, in recent years, expectations of the electrical double layer capacitor that can be used as an alternative to secondary cells or as an auxiliary power supplying source are expanding. In the electrical double layer capacitor, a capacitor element is formed which is made up of a pair of polarized electrodes each having polarized electrode layers containing activated carbon as a main ingredient and each electrode facing another electrode with a separator being interposed between positive and negatively polarized electrodes and the polarized electrode layers making up the electrodes are impregnated with an electrolytic solution. Then, an electrical double layer is formed at an interface between each of the polarized electrode layers and the electrolytic solution. When a voltage is applied to the electrical double layer capacitor, electric charges are accumulated in an electrostatic capacitor of the electrical double layer.

Such a conventional electrical double layer as above is disclosed in, for example, Japanese Patent Application Laid-open No. 2002-83749 (see its Abstract and FIG. 1). In the disclosed conventional electrical double layer capacitor, a pair of polarized electrodes each having electrode layers being supported on an aluminum foil power collecting body and each facing another is mounted with a separator being interposed between the polarized electrodes, and each of capacitor elements being wound in a vortex form is housed, together with the electrolytic solution, in a metal case being sealed by a seal.

In recent years, it is required that the electrical double layer capacitor has a high energy density. To achieve this, the electrical double layer capacitor 1 of an electrode winding-around type, as shown in FIGS. 9 and 10, is so configured that a positive electrode 4 in which positive electrode layers 3 are attached, in a covered manner, to surfaces of both sides of a power collecting body 2 made of an aluminum foil and a negative electrode 7 in which negative electrode layers 6 are attached, in a covered manner, to surfaces of both sides of a power collecting body 5 wound with a separator 8 being interposed between the positive electrode 4 and negative electrode 7. By configuring as above, it is possible to make smaller a shape of the electrical double layer and to improve an energy density per unit volume of the electrode. In this case, it is necessary that the negative electrode 7 covers the positive electrode 4 necessarily. This is because there is a possibility that a decomposition reaction of electrolytic solution components in the positive electrode 4 not facing the negative electrode 7 occurs and gas is generated within the electrical double layer capacitor, and an internal pressure is raised, as a result, causing rupture. For example, in an electrical double layer capacitor disclosed in Japanese Patent Application Laid-open No. 2003-100569 (see Abstract and FIG. 1), by making a width of the negative electrode be larger than that of the positive electrode, the negative electrode covers the positive electrode necessarily. By configuring as such, reliability of the electrical double layer capacitor can be ensured.

However, the conventional electrical double layer capacitor has following problems. That is, in the electrical double layer capacitor shown in FIG. 10, the negative electrode 7 has to be placed so as to cover the positive electrode 4 necessarily and, therefore, the negative electrode 7 is excessively wound when the winding of the negative electrode 7 is started or ended. As a result, the shape of the electrical double layer capacitor 1 becomes larger and the excessively wound negative electrode 7 does not serve to make higher electrostatic capacitance and, therefore, it is impossible to make higher energy density per unit volume of the electrical double layer capacitor.

SUMMARY OF THE INVENTION

In view of the above, it is an object of the present invention to provide an electrical double layer capacitor which is capable of ensuring reliability as an electrical double layer capacitor and providing increased energy density per unit volume of a capacitor.

According to a first aspect of the present invention, there is provided an electrical double layer capacitor including:

a positively polarized electrode in which positive electrode layers are attached, in a covered manner, to surfaces of both sides of a first power collecting body formed in a foil shape or a thin sheet shape;

a negatively polarized electrode in which negative electrode layers are attached, in a covered manner, to surfaces of both sides of a second power collecting body formed in a foil shape or a thin sheet shape; and a separator;

wherein the positively polarized electrode and a negatively polarized electrode are wound with a separator being interposed between the positively polarized electrode and the negatively polarized electrode;

wherein an electrical double layer is formed at an interface between an electrolytic solution with which the positive electrode layers, the negative electrode layers, the separator are impregnated and, when a voltage is applied, electric charges are accumulated in an electrostatic capacitor of the electrical double layer; and wherein the negatively polarized electrode is so configured as to cover all surfaces of the positively polarized electrode and portions of the negatively polarized electrode not facing the positive electrode serve as non-covered portions in which the negative electrode layer is not attached in a covered manner.

In the foregoing, a preferable mode is one wherein portions not facing the positively polarized electrode in the outermost radius and the innermost radius of the electric negative layer capacitor serve as the non-covered portions.

Also, a preferable mode is one wherein the portions of the negatively polarized electrode, not facing the positively polarized electrode in an outermost radius and an innermost radius of the electrical double layer capacitor, each are one of the surfaces of the both sides of a second power collecting body.

Also, a preferable mode is one wherein the positively polarized electrode and the negatively polarized electrode are wound into a cylindrical or elliptical cylinder form with the separator being interposed between the positively polarized electrode and the negatively polarized electrode.

With the above configuration, the negatively polarized electrode is configured so as to cover the positively polarized electrode and, therefore, there is no portion in which the positively polarized electrode does not face the negatively polarized electrode, which enables reliability to be ensured. Also, the portions in which the negatively polarized electrode does not face the positive electrode serve as the non-covered portions in which no negative electrode is attached and, as a result, electrostatic capacitance per unit volume of an electrode is made to increase, thus improving energy density.

BRIEF DESCRIPTION OF THE DRAWINGS

The above and other objects, advantages, and features of the present invention will be more apparent from the following description taken in conjunction with the accompanying drawings in which:

FIG. 6 is a diagram showing a result from testing on the electrical double layer capacitor manufactured in the first embodiment of comparative example 1, and of comparative example 2;

FIG. 8 is a diagram showing a result from testing on the electrical double layer capacitor manufactured in the second embodiment of comparative example 4, and of comparative example 4;

DETAILED DESCRIPTION OF THE PREFERRED EMBODIMENTS

Best modes of carrying out the present invention will be described in further detail using various embodiments with reference to the accompanying drawings.

There is provided an electrical double layer capacitor whose negatively polarized electrode covers an entire surface of a positively polarized electrode, in which portions of the negatively polarized electrode not facing the positively polarized electrode and not being covered, in an attached manner, with a negative electrode layer serve as non-covered portions.

First Embodiment

Figure 1:
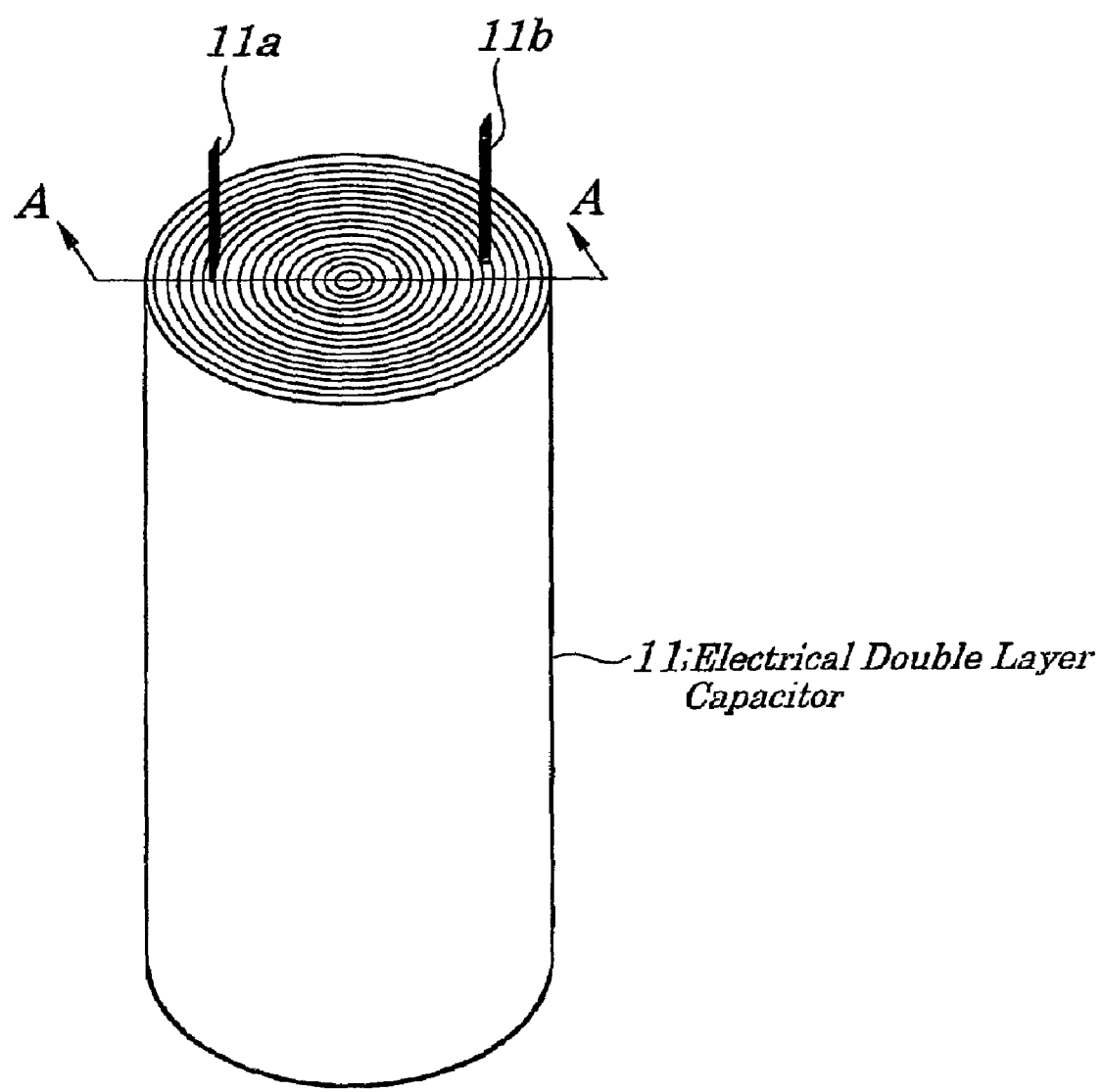
FIG. 1 is a perspective view of an appearance of a main portion of an electrical double layer capacitor according to a first embodiment of the present invention.
Figure 2:
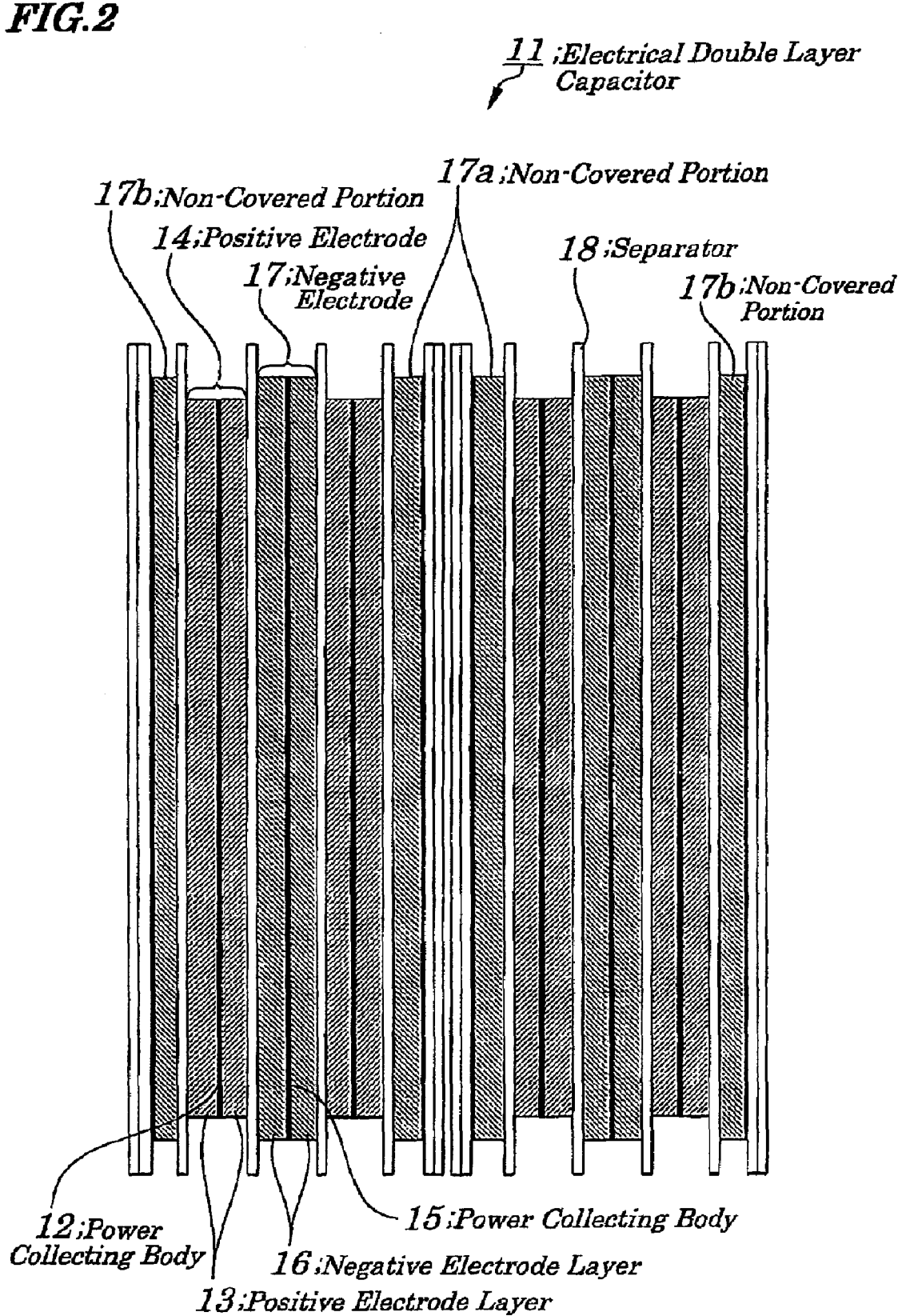
FIG. 2 is a cross-sectional view of the electrical double layer capacitor of FIG. 1 taken along a line A—A.

FIG. 1 is a perspective view of an appearance of a main portion of an electrical double layer capacitor 11 of a first embodiment of the present invention. As shown in FIG. 1, the electrical double layer capacitor 11 of the first embodiment is so configured as to be of the (cylindrical-shaped electrode winding-type) in which tabs (lead terminals) 11a and 11b are mounted at in pre-determined positions. FIG. 2 is a cross-sectional view of the electrical double layer capacitor 11 of FIG. 1 taken along a line A—A. The electrical double layer capacitor 11 of the embodiment, as shown in FIG. 2, includes a positively polarized electrode (hereinafter, simply called a "positive electrode") 14 in which a positive electrode layer 13 is attached, in a covered manner, to surfaces of both sides of a power collecting body 12 made up of, for example, an aluminum foil (aluminum thin sheet), a negatively polarized electrode (hereinafter simply called a "negative electrode") 17 in which a negative electrode layer 16 is attached, in a covered manner, to surfaces of both sides of a power collecting body 15 made up of, for example, an aluminum foil, and a separator 18. The positive electrode 14 and the negative electrode 17 are wound so as to form a cylindrical shape in a manner in which separators 18 are put between the positive electrode 14 and negative electrode 17. Moreover, a electrical double layer is formed at an interface between an electrolytic solution with which the positive electrode layer 13, the negative electrode layer 16, and the separator 18 are impregnated and the positive electrode layer 13 and the negative electrode layer 16 and, where a voltage is applied thereto, electric charges are accumulated in an electrostatic capacitor of the electrical double layer.

Furthermore, the electrical double layer capacitor 11 is constructed in a manner in which the negative electrode 17 covers an entire surface of the positive electrode 14 and portions not facing the positive electrode 14 serve as non-covered portions 17a and 17b in which the negative electrode layer 16 is not attached thereto in a covered manner. The non-covered portion 17a is a portion not facing the positive electrode 14 at the innermost radius of the electrical double layer capacitor 11 and the non-covered portion 17b is a portion not facing the positive electrode 14 at the outermost radius of the electrode double layer capacitor 11.

Figure 3A:
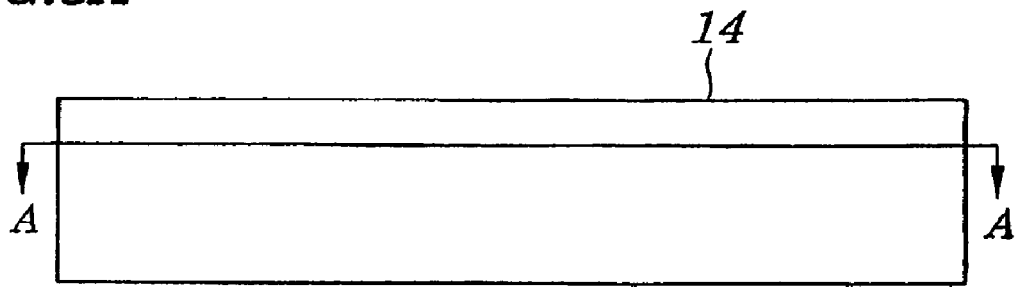
FIGS. 3A and 3B are diagrams showing configurations of a positive electrode of FIG. 2.
Figure 3B:

FIGS. 3A and 3B are diagrams showing configurations of the positive electrode 14 of FIG. 2 and FIG. 3A is a plane expanded diagram of the positive electrode 14 and FIG. 14 is a cross-sectional view of the positive electrode 14 of FIG. 2 taken along a line A—A. In the positive electrode 14, to surfaces of both sides of the power collecting body 12 is attached the positive electrode layer 13 having activated carbon as a main component in a covered manner. Moreover, in FIG. 3B, thicknesses of the power collecting body 12 and the positive electrode layer 13 are shown in a manner in which the thicknesses are larger than their actual thicknesses.

Figure 4A:
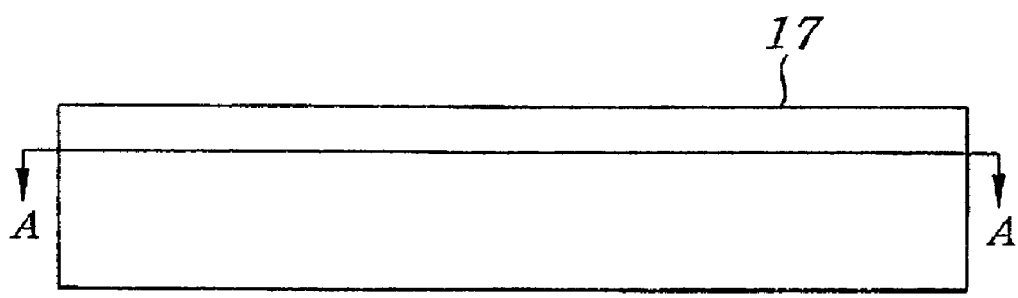
FIGS. 4A and 4B are diagrams showing configurations of a negative electrode of FIG. 2.
Figure 4B:
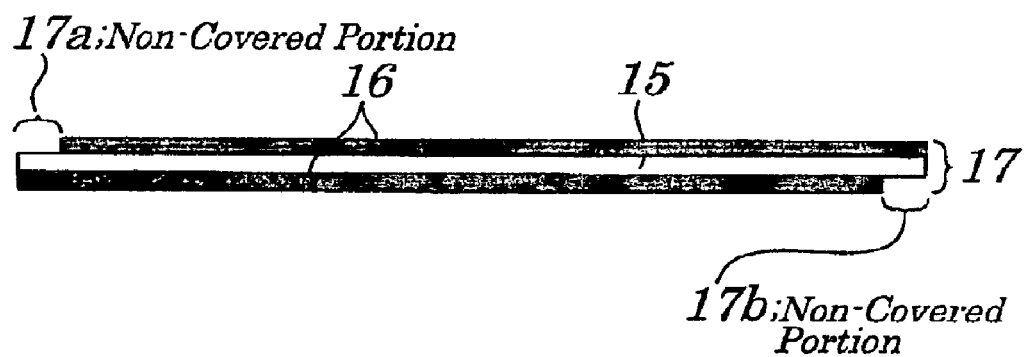

FIGS. 4A and 4B are diagrams showing configurations of the negative electrode 17 of FIG. 2 and FIG. 4A is a plane expanded diagram of the negative electrode 17 and FIG. 4B is a cross-sectional view of the negative electrode 17 of FIG. 4A taken along a line A—A. In the negative electrode 17, to surfaces of both sides of the power collecting body 15 is attached the negative electrode layer 16 having activated carbon as a main component. In a winding start portion on one side of the negative electrode 17 is provided the non-covered portion 17a. In a winding end portion on another side of the negative electrode is provided the non-covered portion 17b. Moreover, longitudinal and horizontal widths of the negative electrode 17 are larger than these of the positive electrode 14. The reason for this is that, by configuring the negative electrode 17 so that the positive electrode 14 is always covered by the negative electrode 17, generation of gas within the electrical double layer capacitor 11 is suppressed. Moreover, in FIG. 4B, thicknesses of the power collecting body 15 and the negative electrode layer 16 are shown in a manner in which the thicknesses are larger than that of an actual thickness.

Next, materials to be used for the electrical double layer capacitor 11 of the embodiment of the present invention are described. The positive electrode layer 13 and negative electrode layer 16 are made up mainly of carbon materials, for example, a phenolic resin activated carbon, coconut-shell activated carbon, petroleum coke activated carbon, polyacene, or a like. Out of the above materials, the phenolic resin activated carbon is preferably used due to its possibility of achieving an electrical double layer capacitor 11 having a large capacity and of high purity. By using, as the activated carbon, a powder having an average particle diameter of 20 μm or less and having a specific surface area of 1000 $m^2/g$ to 3000 $m^2/g$, it is made possible to obtain the electrical double layer capacitor 11 having a large capacity and a low internal resistance. An activation processing method of activated carbon includes a vapor activation processing method and a melting potassium hydroxide (KOH) activation method and, by using an activated carbon obtained by the vapor activation processing method, the electrical double layer having less degradation in characteristics and high reliability. A conductivity auxiliary is added to the positive electrode layer 13 and the negative electrode layer 16. Graphite, carbon black, vapor growth carbon, carbon nanotube, or a like for example are used as the conductivity auxiliary and the graphite or the carbon black in particular, is preferably used.

As power collecting bodys 12 and 15, generally, aluminum, stainless steel, copper, nickel, or a like are employed; however, any one of them may be selected as appropriate according to a characteristic of the electrical double layer capacitor 11 and aluminum may be preferably used. As a binder to attach the positive electrode layer 13 and the negative electrode layer 16 respectively to power collecting bodys 12 and 15 in a covered manner, a material being a chemical being resistant to an organic-solvent electrolytic solution and not affecting a capacitor characteristic, and generally such a chemical as poly-vinylidene fluoride, poly-tetrafluoroethylene or a like is used.

The method of attaching, in a covered manner, the positive electrode layer 13 and the negative electrode layer 16 respectively to the power collecting bodys 12 and 15 is not limited to the above. Alternatively, a method of dispersing materials required for attaching the positive electrode layer 13 and negative electrode layer 16 in a solvent and of attaching, in a painting manner, the solvent to the power collecting bodys 12 and 15 may be applied. The painting method includes a metal masking printing method, electrostatic painting method, dip counting method, spray coating method, roll coating method, doctor blade method, gravure coating method, screen painting method, or alike. Thereafter, a rolling pressing process using a flat plate pressing method, calendar rolling method, or a like may be performed if necessary. Moreover, in addition to these processes, a sheet-shaped electrode may be formed by, for example, an extruding method and the electrode may be attached to the power collecting body 12 and 15 in an integrating manner, by using a conductive binder.

The electrolytic solution is not limited to the above solution and any electrolytic solution may be used so long as the solution can be generally employed for the electrical double layer capacitor 11; that is, the solution obtained by dissolving an electrochemically stable electrolyte in a polarized organic solvent may be appropriately used. As the above electrolyte, a salt consisting essentially of a quaternary onium cation, such as $(C_2H_5)_4N^+$, $(C_4H_9)_4N^+$, $(C_2H_5)_4P^+$, or a like and an anion, such as $BF^-$, $PF^-$, $ClO_4^-$, or a like may be used. As the above organic solvent, carbonates such as prolylene carbonate, butylene carbonate, diethyl carbonate, or a like, lactones such as γ-butyrolactone, sulfolane, or a like may be used. Not only one organic solvent but also two or more solvents may be used in combination. As the separator 18, a separator being ordinarily used for an electrical double layer capacitor, for example, rayon paper, glass fiber mixed paper, polypropylene non-woven fabric, or a like may be used.

To produce the electrical double layer capacitor 11, by adding a solvent to a mixture obtained by mixing, at a weight rate of 8:1:1, phenolic-resin activated carbon having a specific surface area of 1500 $m^2/g$, carbon black, polyvinylidene fluoride, slurry is produced. An aluminum foil with a thickness of 30 μm is coated on its both side portions with the slurry by using a doctor blade method to produce polarized electrodes (positive electrode 14 and negative electrode 17). Each of the power collecting bodys 12 and 15 is coated, on its both sides, with the polarized electrode layers (positive electrode layer 13 or negative electrode layer 16) serving as the polarized electrodes so that each of the positive electrode layer 13 and negative electrode layer 16 has a thickness of 75 μm. Thereafter, a slit process is performed on the polarized electrode layers 13 and 16 so as to have its dimensions that can match a shape of each of the electrodes, and then tabs (lead terminals) are attached thereto. As a result, a sheet-shaped electrode is obtained which is made up of the positive electrode 14 having, for example, a width of 27 mm, length of 160 mm, and thickness of 180 μm and of the negative electrode 17 having, for example, a width of 28 mm, length of 200 mm, and thickness of 180 μm.

In portions of the negative electrode 17 where its winding of the negative electrode 17 is just started and just ended, by performing a masking process in the painting process, the non-covered portions 17a and 17b where the electrode layers are not attached in a covered manner and the aluminum foil is exposed are formed. The non-covered portion 17a has a shape with a width of 28 mm and a length of 15 mm from a terminal at which the winding of the negative electrode layer 16 is started and a shape with a width of 28 mm and a length of 40 mm from a terminal at which the winding of the negative electrode layer 16 is ended.

Figure 5A:
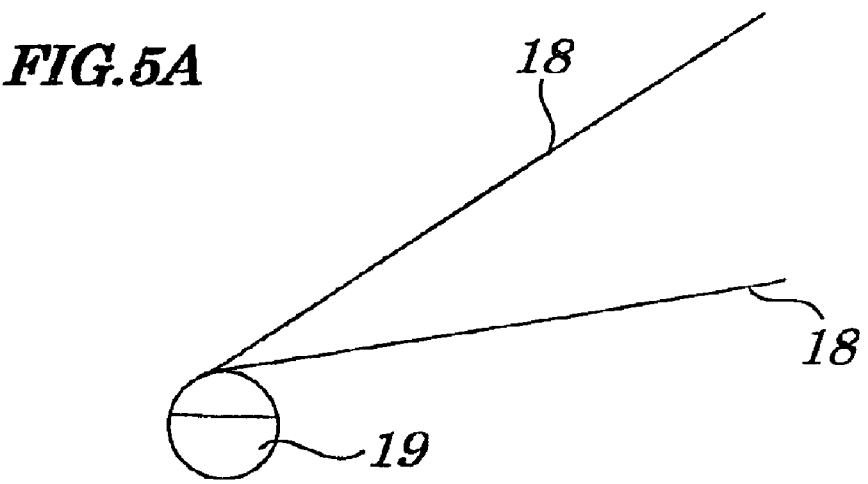
FIGS. 5A, 5B and 5C are diagrams schematically showing as a whole a winding process of the electrical double layer capacitor according to the first embodiment of the present invention.
Figure 5B:
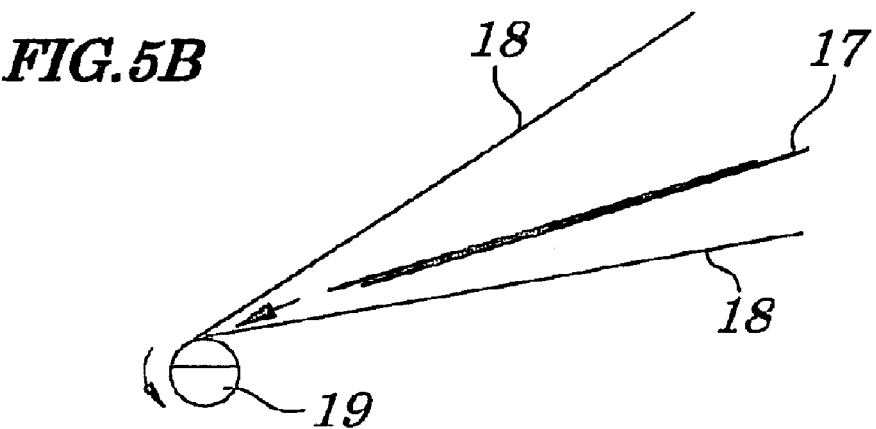
Figure 5C:
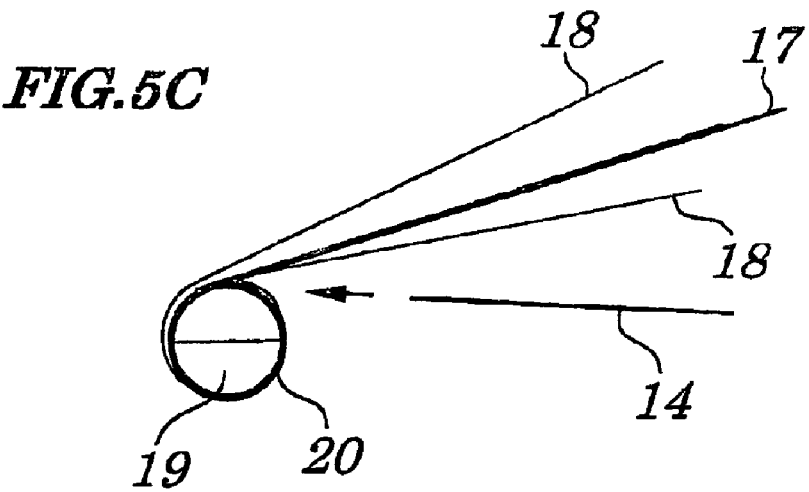

Next, the positive electrode 14 and the negative electrode 17 and two pieces of rayon separators 18 and 18 each having a width of 30 mm and a thickness of 50 μm are attached to a winding-around device. That is, as shown in FIG. 5A, the separators 18 and 18 are set to a winding core 19 and the winding core 19 is rotated 1.5 times so that a reeling shaft is formed. Next, as shown in FIG. 5B, the negative electrode 17 is introduced between the separators 18 and 18 so that the non-covered portion 17a is placed on a side of the winding core 19 and the winding core 19 is rotated 1.25 times. Then, as shown in FIG. 5C, by introducing the positive electrode 14 between a reeling element 20 and the separator 18 to be wound, ten pieces of cylindrical-shaped capacitor element 10 are formed. By winding the negative electrode 17 as above, a portion in which winding of the electrical double layer capacitor 11 is started, as shown in FIG. 2, serves as the non-covered portion 17a in which the positive electrode 14 is always covered by the negative electrode 17 and in which a portion in the innermost radius of the negative electrode 17 does not face the positive electrode 14 is not covered by the negative electrode layer 16.

The capacitor elements are dried under a reduced pressure at a temperature of 150° C. and are housed in a cylindrical-shaped container. A predetermined quantity of 1.0 mol/L of the tetraethylammonium tetrafluoboric acid/proplylene carbonate solution is added dropwide to the capacitor element and reduced/added pressure processing is performed to impregnate the capacitor elements with an electrolytic solution and, then, the container is seated at its cap to produce the electrical double layer capacitor 11.

Figure 10:
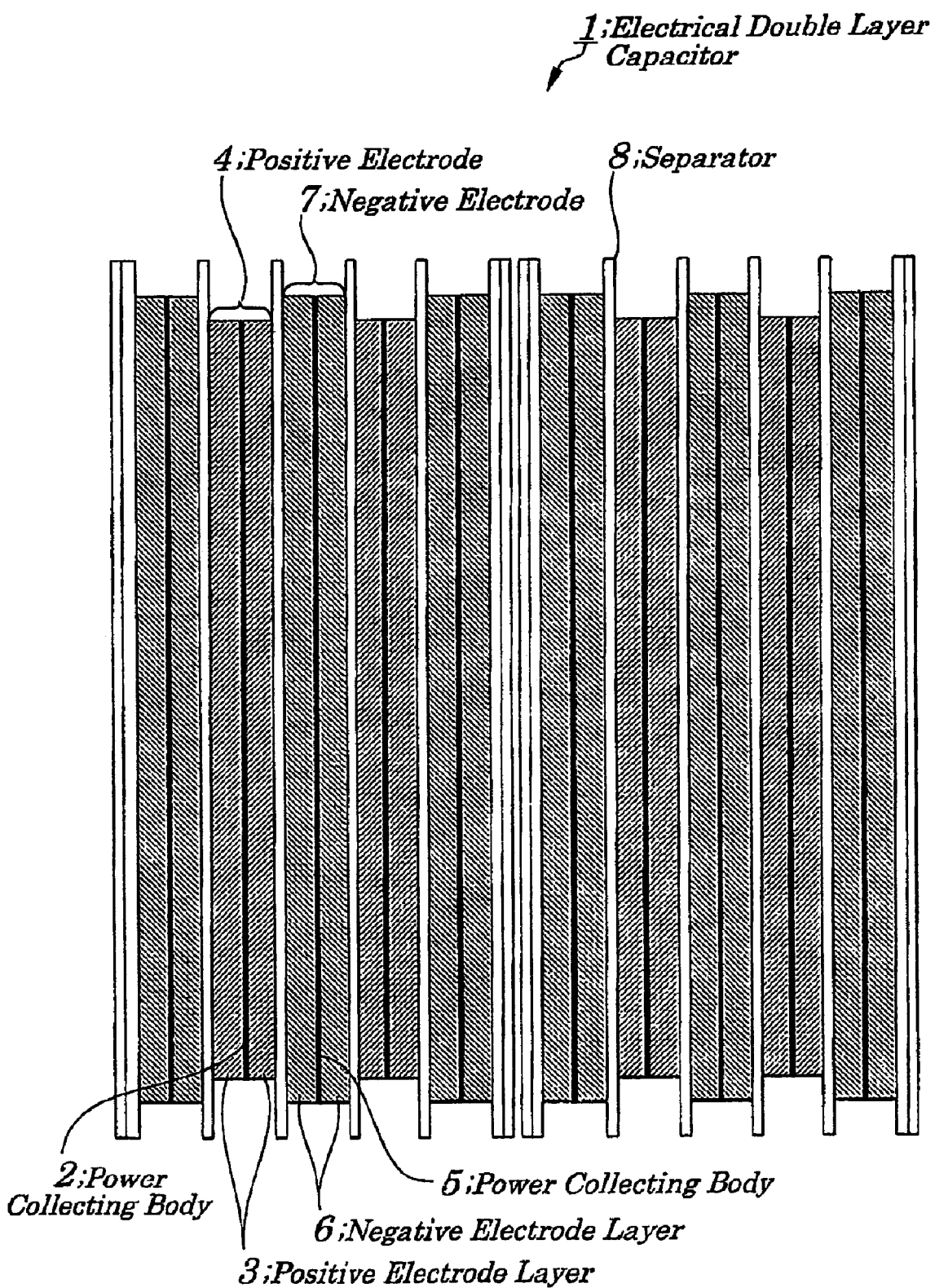
FIG. 10 is a cross-sectional view of the conventional electrical double layer capacitor of FIG. 9 taken along a line A—A.

Here, the electrical double layer capacitor 11 of the embodiment is compared with the conventional electrical double layer capacitor 1 shown in FIG. 10. That is, as a comparative example 1, as in the case of the electrical double layer capacitor 11, a sheet-shaped electrode made up of a positive electrode having a width of 27 mm, length of 160 mm, and thickness of 180 μm and of a negative electrode having a width of 28 mm, length of 200 mm, and thickness of 180 μm is manufactured. The comparative example differs from that of the conventional electrical double layer capacitor 1 in that the coating with the electrode slurry is carried out without a masking process being performed and in that a non-covered portion of the negative electrode is not formed. Except the above, under the same conditions as employed in the manufacturing of the conventional electrical double layer capacitor 1, the cylindrical shaped capacitor element is produced to manufacture ten pieces of the electrical double layer capacitors 11.

Moreover, a comparative example 2 is provided in which a slit process is performed so that a width of a positive electrode is made equal to that of a negative electrode. A sheet-shaped electrode made up of a positive electrode having a width of 28 mm, length of 160 mm, and thickness of 180 μm and of a negative electrode having a width of 28 mm, length of 200 mm, and thickness of 180 cm is manufactured. Except the above, under the same conditions as applied in the case of the electrical double layer capacitor 11, a cylindrical shaped capacitor element is produced to manufacture ten pieces of the electrical double layer capacitor 11.

FIG. 6 is a diagram showing a result from testing on the electrical double layer capacitor 11 manufactured in the first embodiment, a comparative example 1, and a comparative example 2. That is, FIG. 6 shows a result from a high temperature/high voltage applying test obtained by putting the ten pieces of the electrical double layer capacitors 11 manufactured in the first embodiment, and comparative examples 1 and 2 into a constant temperature controlled bath at a temperature of 170° C., and a voltage of 2.5 V is applied for 1000 hours. As shown in FIG. 6, in the electrical double layer capacitor 11, when compared with those shown in the comparative examples 1 and 2, higher electrostatic capacitance per unit volume of an electrode is obtained without degradation in a capacitor characteristic caused by the voltage applying test and/by rupture caused by generation of gas. Thus, according to the first embodiment, the electrical double layer capacitor 11 is so configured that the negative electrode 17 covers all surfaces of the positive electrode 14 and, therefore, there is no portion in which the positive electrode 14 faces the negative electrode 17 and the generation of the gas within the capacitor 11 can be suppressed, which ensures reliability of the capacitor 11. Moreover, a portion in which the negative electrode 17, does not face the positive electrode 14 is used as the non-covered portions 17a and 17b and, as a result, electrostatic capacitance per unit volume of electrode becomes high, thus enabling improvements of energy density.

Second Embodiment

Figure 7:
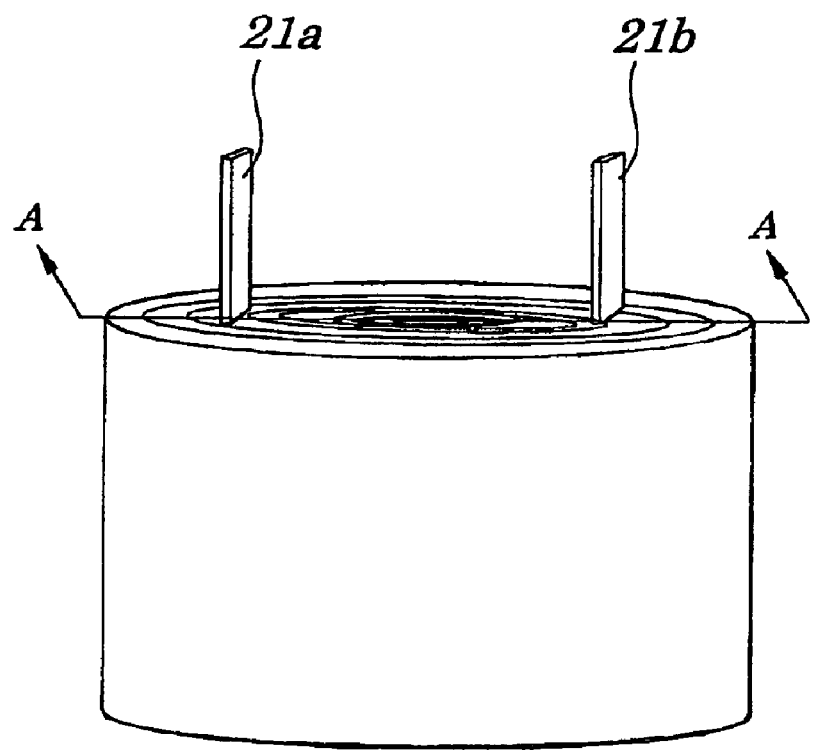
FIG. 7 is a perspective view of an appearance of a main portion of an electrical double layer capacitor according to a second embodiment of the present invention.
Figure 9:
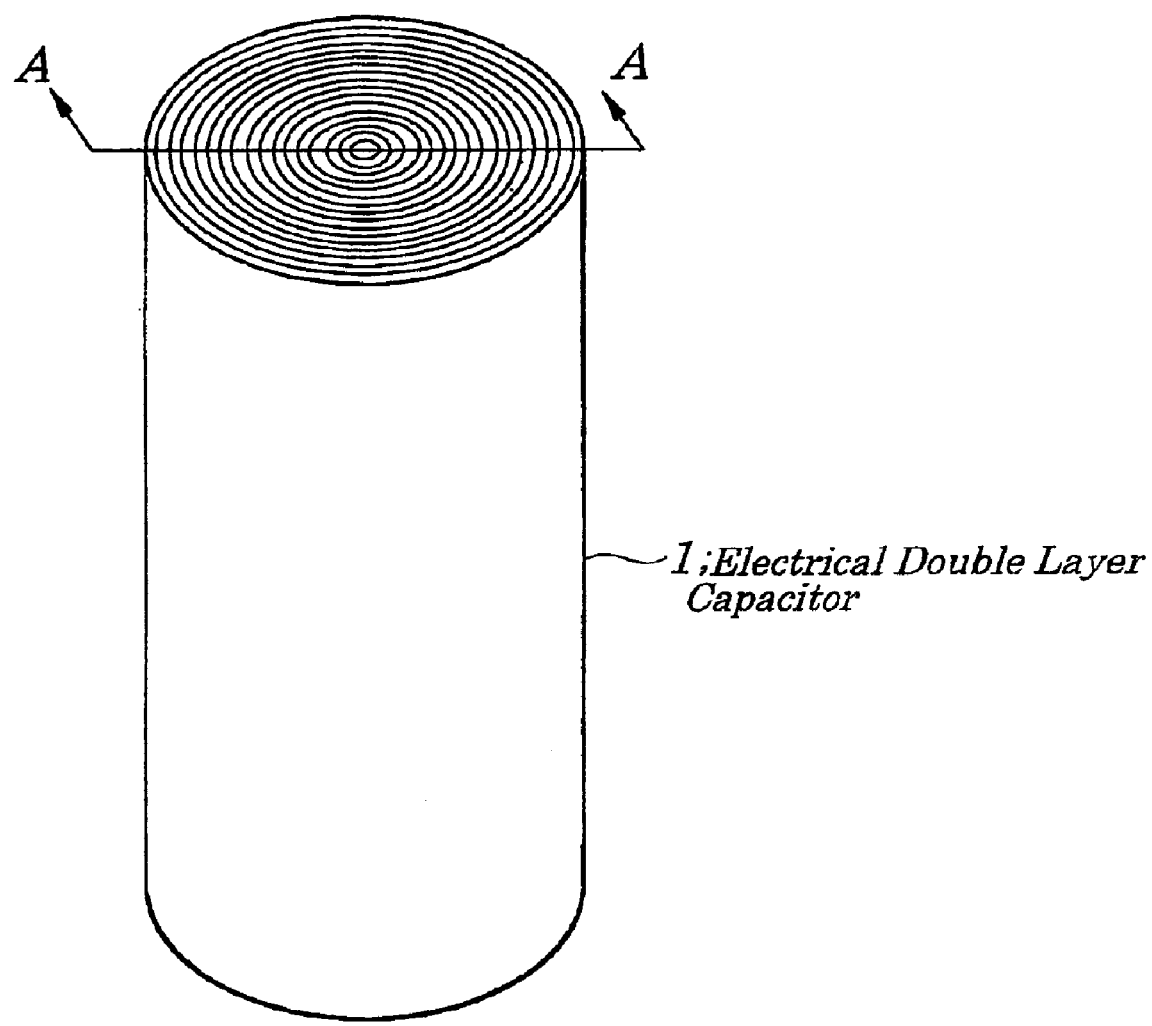
FIG. 9 is a perspective view of an appearance of a conventional electrical double layer capacitor.

FIG. 7 is a perspective view of an appearance of a main portion of an electrical double layer capacitor 21 of the second embodiment of the present invention. As shown in FIG. 7, the electrical double layer capacitor 21 is so configured as to be of elliptical circular cylinder-shaped electrode winding-around type, and tabs (lead terminals) 21a and 21b are attached thereto.

To manufacture the electrical double layer capacitor 21, the same slurry as used in the first embodiment is employed and an aluminum foil with a thickness of 30 μm is coated, at its both sides, with the slurry by a doctor blade method in a manner in which a thickness on each side portion of the aluminum foil becomes 75 μm to produce a polarized electrode and then, tabs (lead terminals) are attached thereto. A sheet-shaped electrode made up of a positive electrode having, for example, a width of 27 mm, length of 430 mm, and thickness of 180 μm and of a negative electrode having, for example, a width of 28 mm, length of 490 mm, and thickness of 180 μm. Moreover, as in the case of the first embodiment, by performing a making process on a portion in which winding of the negative electrode is started and in which winding of the negative electrode is ended, a non-covered portion is formed without an electrode layer being attached and with the aluminum foil being exposed. Each of these non-covered portions has a shape with a width of 28 mm and length of 30 mm from a terminal at which the winding of the negative electrode is started and a width of 28 mm and length of 60 mm from a terminal at which the winding of the negative electrode is ended.

Next, the positive electrode, negative electrode, and two pieces of rayon (fiber made from cellulose) separators having a width of 30 mm and thickness of 50 μm are mounted on a winding-around device. First, the separators are set on a winding jig of the winding-around device and the winding jig is rotated 1.5 times to form a reeling shaft. Then, the negative electrode is introduced between the separators so that its non-covered portion is placed on a side of the winding jig and the winding jig is rotated 1.25 times. Next, the positive electrode is introduced between a reeling element and separator and a winding process is performed to form an elliptical-cylinder shaped capacitor element. The capacitor element is dried at a temperature of 150° C. for 24 hours and then is housed in an aluminum laminated container one end of which is open. Thereafter, a predetermined quantity of 1.0 mol/L of the tetraethylammonium tetrafluoro borate/propylene carbonate solution is dripped into the capacitor element and reduced pressure processing/pressurization processing are performed to impregnate the capacitor elements with an electrolytic solution. Next, the open portion of the aluminum laminated container is sealed thermally under reduced pressure and ten pieces of the electrical double layer capacitors 21 are manufactured.

Here, the electrical double layer capacitor 21 is compared with a conventional electrical double layer capacitor 1. That is, as a comparative example 3, as in the case of the electrical double layer capacitor 21, a sheet-shaped electrode made up of a positive electrode having a width of 27 mm, length of 430 mm, and thickness of 180 μm and of a negative electrode having a width of 28 mm, length of 490 mm, and thickness of 180 μm is manufactured. The comparative example 3 differs from that of the electrical double layer capacitor 21 in that the coating with the electrode slurry is carried out without a masking process being performed and in that the non-covered portions of the negative electrode are not formed. Except the above, under the same conditions as employed in the manufacturing of the electrical double layer capacitor 21, the elliptical-cylinder shaped capacitor element is produced to manufacture ten pieces of the electrical double layer capacitors 21.

Moreover, a comparative example 4 is prepared in which a slit process is performed so that a length of a positive electrode is made equal to that of a negative electrode. That is, a sheet-shaped electrode made up of a positive electrode having a width of 28 mm, length of 430 mm, and thickness of 180 μm and of a negative electrode having a width of 28 mm, length of 430 mm, and thickness of 180 μm is manufactured. Except the above, under the same conditions as employed in the manufacturing of the electrical double layer capacitor 21, the elliptical-cylinder shaped capacitor element is produced to manufacture ten pieces of the electrical double layer capacitors 21.

FIG. 8 shows a result from testing on the electrical double layer capacitor 21 manufactured in the second embodiment and comparative examples 3 and 4. That is, FIG. 8 shows a result from a high temperature/high voltage applying test obtained by putting the ten pieces of the electrical double layer capacitor 21 manufactured in the embodiment, comparative examples 3 and 4 into a constant temperature controlled bath at a temperature of 60° C. and a voltage of 2.3 V is applied for 1000 hours. As shown in FIG. 8, in the electrical double layer capacitor 21, when compared with those shown in the comparative examples 3 and 4, higher electrostatic capacitance per unit volume of an electrode is obtained without degradation in capacitor characteristics caused by the voltage applying test and/by rupture caused by generation of gas. Thus, in the second embodiment also, the same advantage as obtained in the first embodiment can be achieved.

It is apparent that the present invention is not limited to the above embodiments but may be changed and modified without departing from the scope and spirit of the invention. For example, shape of the electrical double layer capacitor of the present invention is not limited to a cylindrical shape or an elliptical cylinder shape having the cross-sectional profile of an ellipse, and a prism shape may be applicable as well. However, in this case, a volume of an electrical double layer capacitor is small when compared with that of the cylindrical one using the same amount of materials.

Moreover, the present invention can be applied to all types of the electrical double layer capacitors and, in particular, can be effectively used for portable electronic devices such as a portable cellular device and/or a notebook personal computer in which miniaturization is required.

What is claimed is:

1. An electrical double layer capacitor comprising:
    a positively polarized electrode in which positive electrode layers are attached, in a covered manner, to surfaces of both sides of a first power collecting body formed in a foil shape or a thin sheet shape;
    a negatively polarized electrode in which negative electrode layers are attached, in a covered manner, to surfaces of both sides of a second power collecting body formed in a foil shape or a thin sheet shape; and
    a separator;
    wherein said positively polarized electrode and a negatively polarized electrode are wound with a separator being interposed between said positively polarized electrode and said negatively polarized electrode;
    wherein an electrical double layer is formed at an interface between an electrolytic solution with which said positive electrode layers, said negative electrode layers, said separator are impregnated and, when a voltage is applied, electric charges are accumulated in an electrostatic capacitor of said electrical double layer; and
    wherein said negatively polarized electrode is so configured as to cover all surfaces of said positively polarized electrode and portions of said negatively polarized electrode not facing said positive electrode serve as non-covered portions in which said negative electrode layer is not attached in a covered manner.

2. The electrical double layer capacitor according to claim 1, wherein said positively polarized electrode and said negatively polarized electrode are wound into a cylindrical or elliptical cylinder form with said separator being interposed between said positively polarized electrode and said negatively polarized electrode.

3. The electrical double layer capacitor according to claim 1, wherein portions of said negatively polarized electrode, not facing said positively polarized electrode in an outermost radius and an innermost radius of the electrical double layer capacitor, serve as said non-covered portions.

4. The electrical double layer capacitor according to claim 2, wherein said positively polarized electrode and said negatively polarized electrode are wound into a cylindrical or elliptical cylinder form with said separator being interposed between said positively polarized electrode and said negatively polarized electrode.

5. The electrical double layer capacitor according to claim 3, wherein said portions of said negatively polarized electrode, not facing said positively polarized electrode in an outermost radius and an innermost radius of the electrical double layer capacitor, each are one of said surfaces of said both sides of a second power collecting body.

6. The electrical double layer capacitor according to claim 5, wherein said positively polarized electrode and said negatively polarized electrode are wound into a cylindrical or elliptical cylinder form with said separator being interposed between said positively polarized electrode and said negatively polarized electrode.

* * * * *